US008505438B2

(12) United States Patent
Choi et al.

(10) Patent No.: US 8,505,438 B2

(45) Date of Patent: Aug. 13, 2013

(54) CYLINDER LINER AND METHOD OF MANUFACTURING THE SAME

(75) Inventors: Jongil Choi, Daejeon (KR); Sangdeuk Han, Daejeon (KR); Changbae Han, Daejeon (KR); Jongku Park, Daejeon (KR); Giseog An, Daejeon (KR); Joongsoo Kim, Daejeon (KR); Jinwoo Cho, Gyeonggi-do (KR)

(73) Assignees: Yoosung Enterprise Co., Ltd., Asan-Si (KR); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 902 days.

(21) Appl. No.: 12/646,757

(22) Filed: Dec. 23, 2009

(65) Prior Publication Data

US 2010/0162886 A1 Jul. 1, 2010

(30) Foreign Application Priority Data

Dec. 29, 2008 (KR) ........................ 10-2008-0135601
Apr. 2, 2009 (KR) ........................ 10-2009-0028575

(51) Int. Cl.
*B22D 19/00* (2006.01)
*F16J 10/04* (2006.01)

(52) U.S. Cl.
USPC ....................................... 92/171.1; 29/888.06

(58) Field of Classification Search
USPC ....................... 92/171.1; 29/888.06, 888.061
See application file for complete search history.

(56) References Cited

U.S. PATENT DOCUMENTS

| | | | | |
|---|---|---|---|---|
| 1,955,292 | A * | 4/1934 | Heintz | 29/888.061 |
| 6,123,052 | A * | 9/2000 | Jahn | 29/888.061 |
| 2007/0012177 | A1* | 1/2007 | Miyamoto et al. | 92/171.1 |
| 2007/0012178 | A1* | 1/2007 | Takami et al. | 92/171.1 |

FOREIGN PATENT DOCUMENTS

| | | | |
|---|---|---|---|
| CN | 1576558 | A | 2/2005 |
| JP | 3-138069 | A | 6/1991 |
| JP | 8-290255 | A | 11/1996 |

(Continued)

OTHER PUBLICATIONS

Polymet "High Performance Wire for Hardfacing, Welding and Thermal Spraying", Jun. 21,2006.*

*Primary Examiner* — Thomas E Lazo

(74) *Attorney, Agent, or Firm* — Morgan, Lewis & Bockius LLP

(57) ABSTRACT

The present invention relates to a cylinder liner and a method of manufacturing the cylinder liner. A cylinder liner according to the present invention has an outer surface covered by casting metal when a cylinder block is manufactured by integral casting, in which a plurality of engraved grooves is formed throughout the outer surface of the cylinder liner to increase bonding force between the casting metal and the outer surface of the cylinder liner. Further, a method of manufacturing a cylinder liner according to the present invention includes: coating a coating material onto the inner circumferential surface of a mold rotating and drying the coating material for a predetermined time; applying an engraved-groove forming material to engrave the surface of the coating material; forming a cylinder liner parent body by pouring and solidifying molten metal through the surface of the coating material where the engraved-groove forming material is applied; and roughening the outer surface of the cylinder liner with a plurality of engraved grooves for spraying, after drawing the cylinder parent body out of the mold and removing the coating material and the engraved-groove forming material covering the outer surface of the cylinder liner parent body.

10 Claims, 5 Drawing Sheets

(56) References Cited

FOREIGN PATENT DOCUMENTS

| | | | | |
|---|---|---|---|---|
| JP | 2000-310154 | A | | 11/2000 |
| JP | 2001-334357 | A | | 12/2001 |
| JP | 2003-326353 | A | | 11/2003 |
| JP | 2004-84622 | A | | 3/2004 |
| KR | 10-0411077 | B1 | | 7/2002 |
| KR | 10-2005-0006751 | A | | 1/2005 |
| KR | 10-2005-0066158 | A | | 6/2005 |
| KR | 1020050066158 | | * | 6/2005 |

* cited by examiner

CYLINDER LINER AND METHOD OF MANUFACTURING THE SAME

CROSS-REFERENCE TO RELATED APPLICATIONS

The present application claims priority to Korean Patent Application Number 10-2008-0135601 and 10-2009-0028575 filed Dec. 29, 2008 and Apr. 2, 2009, the entire contents of which application is incorporated herein for all purposes by this reference.

BACKGROUND OF THE INVENTION

1. Field of the Invention

The present invention relates to a cylinder liner and a method of manufacturing the cylinder liner.

2. Description of Related Art

In general, cylinders are hollow cylindrical parts in which pistons are guided to reciprocate in internal combustion engines for vehicles. Other than the cylinders used in reciprocating piston internal combustion engines, typical cylinders are cylinders used in reciprocating compressors and cylinders used in oil pressure, hydraulic, and pneumatic machines.

In the reciprocating piston internal combustion engine, an engine equipped with one cylinder is called a single-cylinder engine.

Further, multi-cylinder engines are classified into an in-line type engine, a V-type engine, an opposed engine, and a radial engine, in accordance with the arrangement type of cylinders.

In the multi-cylinder engines, there is an engine having an integral structure by casting several cylinder parts into one block, which is called a cylinder block.

A part that is a relatively thin cylindrical tube that is inserted to provide a reciprocation surface for a piston reciprocating therein, when the guide reciprocation surface for the piston formed by directly machining above structure is insufficient in strength and durability is called a cylinder liner.

A predetermined number of cylinder liners are arranged in a mold in accordance with the displacement of an engine and then integrally formed with the cylinder block by pouring molten metal of a block material, by integral casting.

In this configuration, the gap between a pair of adjacent cylinder liner in the plurality of cylinder liners arranged in the cylinder block is called a bore gap.

In recent years, various efforts for reducing the size and weight of an engine by reducing as much as possible the bore gap between cylinder liners while increasing the bonding strength between the cylinder liners and a cylinder block have been made.

For example, a cylinder liner in the related art is schematically described below.

As shown in FIG. 1, according to a cylinder liner in the related art, grooves are formed on the surface of an coating material particularly in the process of applying the coating material to a mold in the manufacturing process, molten metal for a cylinder liner is poured into the surface of the coating material, the poured molten metal covers the surface of the coating material and permeates the grooves, and the molten metal is solidified after a predetermined time, and as a result, a parent body of the cylinder liner is completed.

Thereafter, the parent body of the cylinder liner is drawn out of the mold and the coating material on the outer surface is removed, such that a cylinder liner 5 having predetermined protrusions 5*a* throughout the outer surface is completed.

Consequently, a cylinder block integrally formed with the cylinder liner is completed by pouring again cylinder liner 5 in a mold for manufacturing a cylinder block and pouring molten metal of a block material, into the mold by integral casting.

Cylinder liners 5 integrally formed with the cylinder block are strongly combined with the cylinder block by protrusions 5*a* on the outer surfaces.

However, according to the cylinder liner in the related art, the cylinder liner can be strongly combined with a cylinder block by protrusions formed on the outer surface, whereas the cylinder liner is thick and the size of a bore gap correspondingly increases, such that there is a problem that the size and weight of an engine increase.

Further, the protrusions on the outer surface of the cylinder lines interferes with the flow of the molten metal of a block material that is inserted in the mold, such that there is a problem that the time for manufacturing the cylinder block increases with the decrease of the overall fluidity of the block material and inferior quality may be caused by long-time solidification.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a cylinder liner and a method of manufacturing the cylinder liner, which make it possible to improve bonding strength and thermal conductivity between the cylinder block and the cylinder liner in forming a cylinder block, reduce the thickness of the cylinder liner and a bore gap as much as possible, and minimize the entire size and weight of an engine, by forming a plurality of engraved grooves throughout the outer surface of the cylinder liner.

Further, another aspect of the present invention is directed to provide a cylinder liner and a method of manufacturing the cylinder liner that make it possible to minimize inferiority ratio of a product by quickly solidifying a block material while considerably reducing the time for manufacturing a cylinder block, by removing factors interfering with the flow of the block material between cylinder liners to improve fluidity of the block material.

Various aspects of the present invention are directed to provide a cylinder liner having an outer surface covered by casting metal when a cylinder block is manufactured by integral casting, in which a plurality of engraved grooves is formed throughout the outer surface of the cylinder liner to increase bonding force between the casting metal and the outer surface of the cylinder liner.

The cylinder liner of the present invention further includes a metal layer for improving thermal conductivity while covering the outer surface of the engraved grooves.

In particular, it is preferable that the engraved groove is formed to be depressed inside from the outer surface of the cylinder liner such that the upper portion is wide and the lower portion is narrow.

Further, it is preferable that the engraved grooves are distributed by thirty to three hundreds per area of 20 mm×20 mm of the outer surface of the cylinder liner.

Further, it is preferable that the engraved groove has a diameter of 0.7±0.2 mm at the upper end and a depth of 0.4±0.2 mm.

Further, it is preferable that the metal layer is formed by electric arc spraying that uses a plurality of wires.

Further, it is preferable that the metal layer is made of the same material as the cylinder block, or aluminum or an aluminum alloy.

Further, it is preferable that the aluminum alloy component of the metal layer contains 11~13 parts by weight of silicon to 100 parts by weight of aluminum.

Further, it is preferable that the component of the aluminum alloy further contains any one, or two or more of 0.001~0.3 parts by weight of copper, 0.001~0.8 parts by weight of iron, 0.001~0.1 parts by weight of magnesium, 0.001~0.15 parts by weight of manganese, 0.001~0.2 parts by weight of zinc, and 0.001~0.008 parts by weight of beryllium, to 100 parts by weight of aluminum.

Further, it is preferable that the metal layer has a 50~200 μm thickness.

Further, an other aspect of the present invention is directed to provide method of manufacturing a cylinder liner including: coating a coating material onto the inner circumferential surface of a mold rotating and drying the coating material for a predetermined time; applying an engraved-groove forming material to engrave the surface of the coating material; forming a cylinder liner parent body by pouring and solidifying molten metal through the surface of the coating material where the engraved-groove forming material is applied; and roughening the outer surface of the cylinder liner with a plurality of engraved grooves for spraying, after drawing the cylinder parent body out of the mold and removing the coating material and the engraved-groove forming material covering the outer surface of the cylinder liner parent body.

Further, the method further includes forming a metal layer on the outer surface of the cylinder liner with the plurality of engraved grooves to improve thermal conductivity.

Further, it is preferable that the engraved groove is formed to be depressed inside from the outer surface of the cylinder liner such that the upper portion is wide and the lower portion is narrow.

Further, it is preferable that the engraved grooves are distributed by thirty to three hundreds per area of 20 mm×20 mm of the outer surface of the cylinder liner.

Further, it is preferable that the engraved groove has a diameter of 0.7±0.2 mm at the upper end and a depth of 0.4±0.2 mm.

Further, it is preferable that the metal layer is formed by electric arc spraying that uses a plurality of wires.

Further, it is preferable that the metal layer is made of the same material as the cylinder block, or aluminum or an aluminum alloy.

Further, it is preferable that the component of the metal layer contains 11~13 parts by weight of silicon to 100 parts by weight of aluminum.

Further, it is preferable that the aluminum alloy component of the metal layer further contains any one, or two or more of 0.001~0.3 parts by weight of copper, 0.001~0.8 parts by weight of iron, 0.001~0.1 parts by weight of magnesium, 0.001~0.15 parts by weight of manganese, 0.001~0.2 parts by weight of zinc, and 0.001~0.008 parts by weight of beryllium, to 100 parts by weight of aluminum.

Further, it is preferable that the metal layer has a 50~200 μm thickness.

According to the present invention, it is possible to improve bonding strength and thermal conductivity between the cylinder block and the cylinder liner in forming a cylinder block, reduce the thickness of the cylinder liner and a bore gap as much as possible, and minimize the entire size and weight of an engine, by forming a plurality of engraved grooves throughout the outer surface of the cylinder liner.

Further, another aspect of the present invention is directed to minimize inferiority ratio of a product by quickly solidifying a block material while considerably reducing the time for manufacturing a cylinder block, by removing factors interfering with the flow of the block material between cylinder liners to improve fluidity of the block material.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 5 to 9 are views illustrating a method of manufacturing a cylinder liner according to the present invention, in which FIG. 5 is a view illustrating a process of applying a coating material in a mold, FIG. 6 is a view illustrating a process of pouring a molten metal into the mold, FIG. 7 is a view illustrating a process of drawing a cylinder liner parent body out of the mold, FIG. 8 is a view illustrating a process of roughening the outer surface of the cylinder liner with the coating material and engraved-groove forming material removed, and FIG. 9 is a view illustrating a process of spraying for forming a metal layer on the outer surface of the cylinder liner.

DETAILED DESCRIPTION OF THE INVENTION

Figure 1:
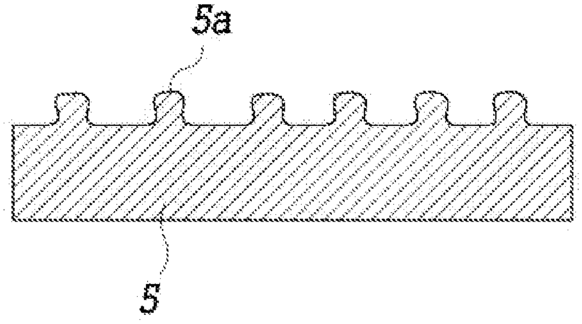
FIG. 1 is a view showing that protrusions are formed on the outer surface of a cylinder liner according to the related art.
Figure 2:
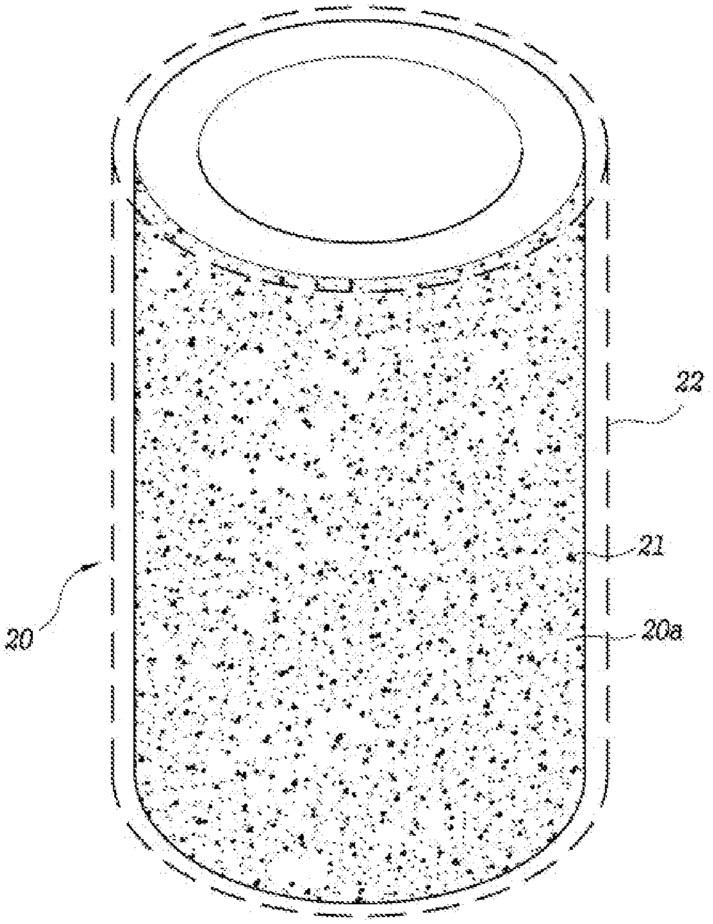
FIG. 2 is a perspective view showing a cylinder liner according to an embodiment of the present invention.
Figure 3:
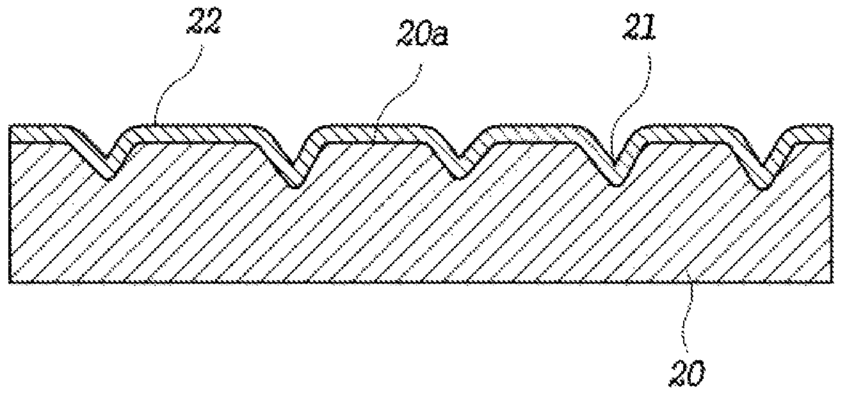
FIG. 3 is a cross-sectional view showing a cylinder liner according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, preferred embodiments of the present invention will be described in detail with reference to the accompanying drawings.

As shown in FIGS. 2 to 10, a cylinder liner according to an embodiment of the present invention is bonded to a cylinder block 10 for an internal combustion engine, in which a plurality of engraved grooves 21 for increasing the bonding force between a casting metal (block material) and a cylinder liner 20 and a metal layer 22 for improving thermal conductivity between cylinder block 10 and cylinder liner 20 are formed by pouring the casting metal throughout the outer surface 20*a* of cylinder liner 20 having an outer surface that is covered by the casting metal by pouring cast, in order to manufacture cylinder block 10.

In this configuration, engraved grooves 21 are depressed inside from smooth outer surface 20*a* of cylinder liner 20 such that the upper portion is wide and the lower portion is narrow.

Other than engraved grooves 21 having the wide upper portion and the narrow lower portion, engraved grooves having other structures that can improve the bonding strength between cylinder block 10 and cylinder liner 20 can be implemented, such as an engraved groove having the narrow upper portion and the wide lower portion, opposite to the above structure.

Thirty to three hundreds of engraved grooves 21 are distributed per 20 mm×20 mm throughout outer surface 20*a* of cylinder liner 20 and it is preferable that the diameter of the upper end is 0.7±0.2 mm and the depth is 0.4±0.2 mm.

Further, the metal layer 22 is formed by electric arc spraying that uses a plurality of wires.

Figure 9:
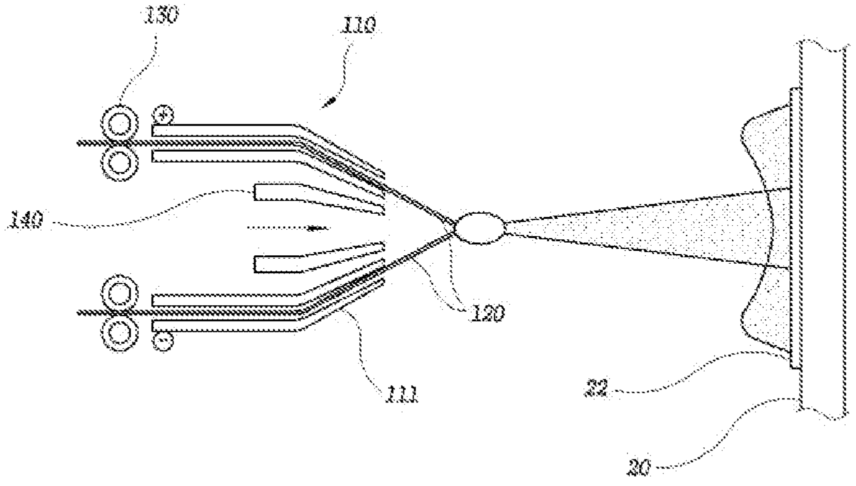

The electric arc spraying, as shown in FIG. 9, may be general spraying in which two pieces of wire 120 made of an aluminum alloy are applied to wire guides 111 of a spray 110 through feeding rollers 130, and at the same time, the front ends of the wires 120 are molten by arc generated by electric power applied from an electric source composed of the wires 120, and then the molten metal is poured forward at high pressure by an air compressor 140 such that a desired metal layer 22 is formed on outer surface 20*a* of cylinder liner 20.

Metal layer 22 is made of an aluminum alloy and the aluminum alloy component of metal layer 22 contains 11~13 parts by weight of silicon to 100 parts by weight of aluminum.

Alternatively, the aluminum alloy component contains metal layer 22 contains 11~13 parts by weight of silicon to 100 parts by weight of aluminum, and may contain any one, or two or more of 0.001~0.3 parts by weight of copper, 0.001~0.8 parts by weight of iron, 0.001~0.1 parts by weight of magnesium, 0.001~0.15 parts by weight of manganese, 0.001~0.2 parts by weight of zinc, and 0.001~0.008 parts by weight of beryllium.

It is preferable that metal layer 22 sprayed as described above has a 50~200 μm thickness.

In this configuration, metal layer 22 may be made of the same material as cylinder block or aluminum, other than the aluminum alloy.

Figure 5:
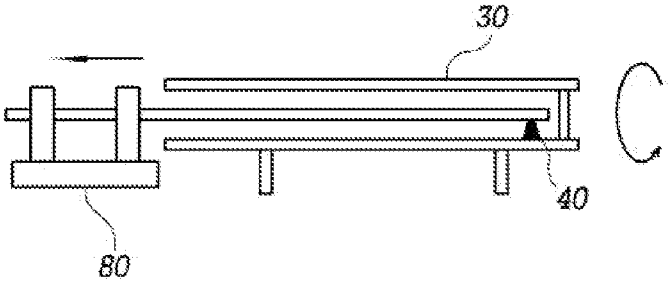

According to a method of manufacturing the cylinder liner according to an embodiment of the present invention, as shown in FIG. 5, a predetermined coating material 40 is provided and coated on the inner circumferential surface of a mold 30 rotating, and then dried for a predetermined time.

The operation of applying coating material 40 is performed by a specific coating material coating machine 80 that applies coating material 40 throughout the inner circumferential surface of mold 30 rotating.

Figure 4:
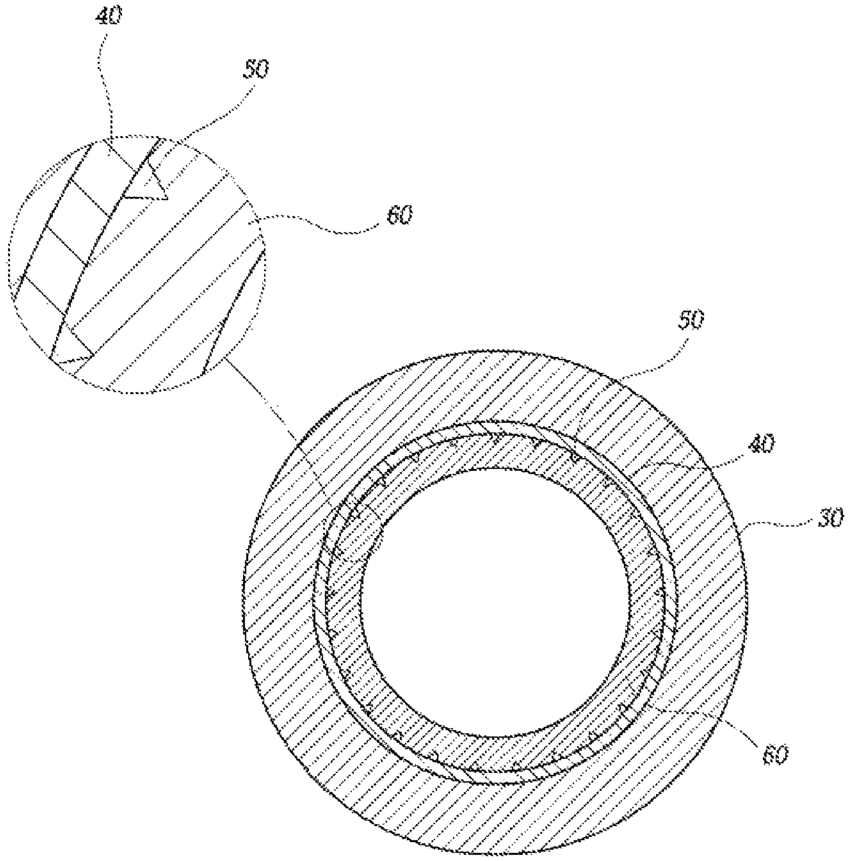
FIG. 4 is a cross-sectional view showing a cylinder liner according to the present invention which is disposed in a mold as a parent body.

Further, an engraved-groove forming material 50 for engraving shown in FIG. 4 is applied onto the surface of coating material 40 coated and dried on the inner circumferential surface of mold 30.

Coating material 40 can be bonded by the centrifugal force by the rotation of mold 30 and the bonding force of coating material 40.

Figure 6:
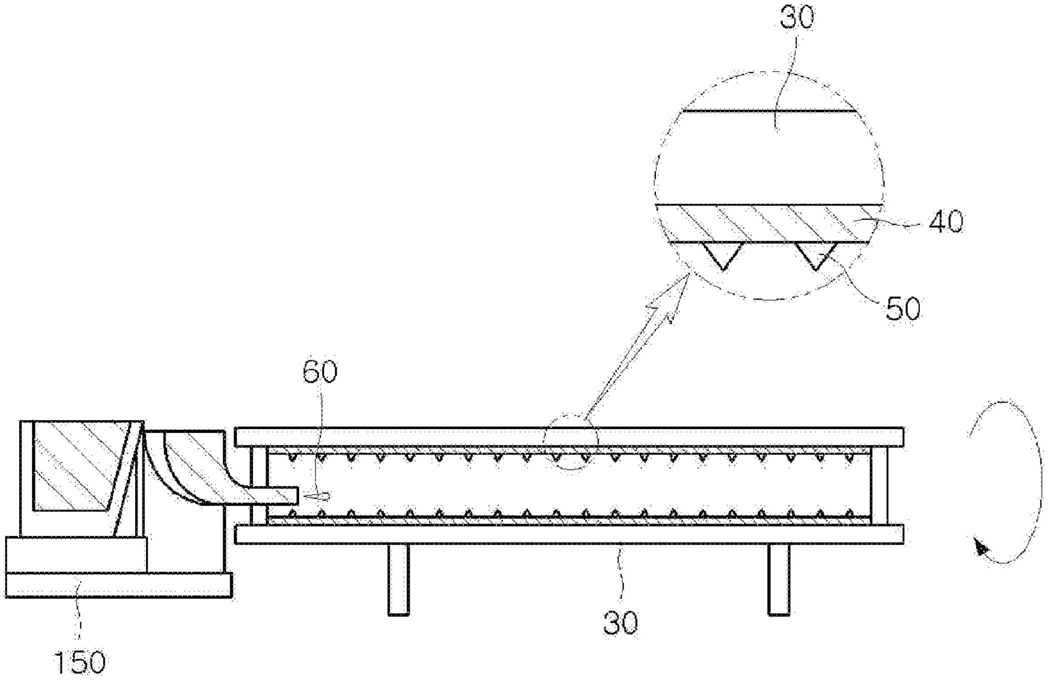
Figure 7:
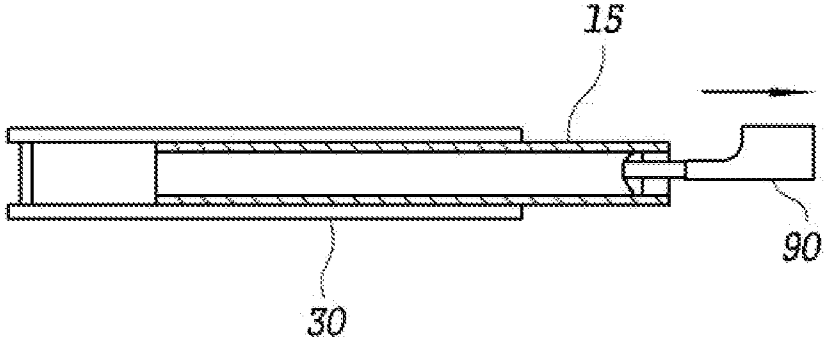

Further, a cylinder liner parent body 15 shown in FIG. 7 is formed by, as shown in FIGS. 4 and 6, pouring molten metal 60 for a cylinder liner into the surface of coating material 40 coated with engraved-groove forming material 50 and then solidifying molten metal 60 for a predetermined time.

Reference numeral '150' not stated in FIG. 6 designates a molten metal injector for pouring molten metal 60 for cylinder liner.

Figure 8:
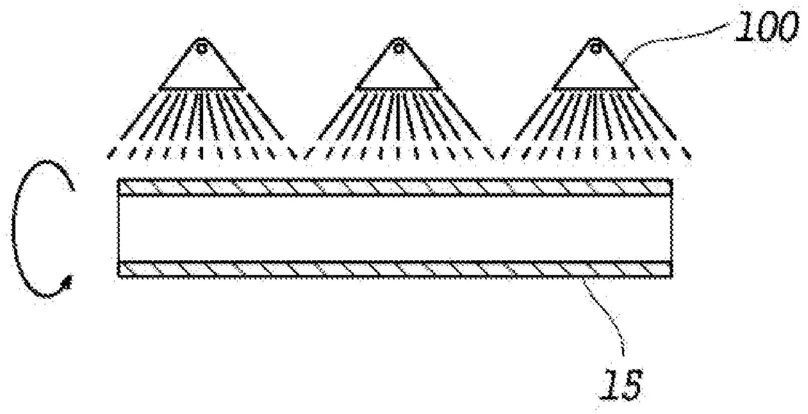

Thereafter, as shown in FIG. 7, cylinder liner parent body 15 is drawn out of mold 30, as shown in FIG. 8, coating material layer 40 and engraved-groove forming material 50 covering the outer side of parent body 15 are removed, and then, the outer surface of cylinder liner 20 is roughened for spraying, by a roughening machine 100.

Thereafter, as shown in FIG. 9, cylinder liner 20 having engraved grooves 21 and metal layer 22 on the outer surface is finally completed by performing the spraying to outer surface 20*a* of cylinder liner 20 roughened by spray 110.

Reference numeral '90' not stated in FIG. 8 designates a drawer that draws cylinder liner parent body 15 out of mold 30.

In cylinder liner 20 completed as described above, engraved grooves 21 are formed to be depressed inside from the smooth outer surface 20a of cylinder liner 20, in which each of engraved grooves has a wide upper portion and a narrow lower portion. Further, thirty to three hundreds of engraved grooves 21 are distributed per 20 mm×20 mm on outer surface 20*a* of cylinder liner 20 to have a diameter of 0.7±0.2 mm and a depth of 0.4±0.2 mm.

Further, metal layer 22 made of an aluminum alloy having a 50~200 μm thickness is applied again onto the surface of engraved grooves 21.

Figure 10:
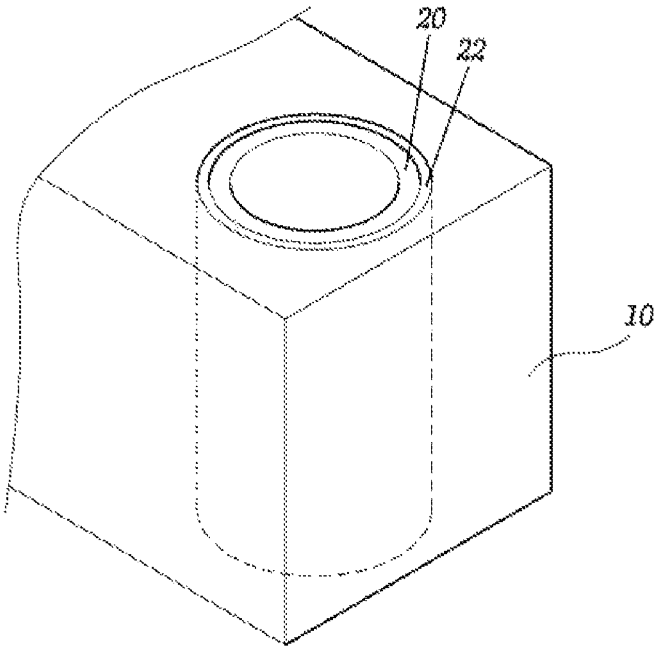
FIG. 10 is a view showing a cylinder block that has been manufactured by integral casting, using a cylinder liner according to the present invention.

On the other hand, as shown in FIG. 10, a predetermined number of cylinder liner 20 completed as described above is disposed in a mold (not shown) for manufacturing cylinder block 10 in accordance with the displacement of a desired engine and molten metal of a block material is poured by integral casting. The block material is uniformly diffused inside the mold and covers the entire outer surface of cylinder liner 20 coated with metal layer 22 while permeating engraved grooves 21 of outer surface 20*a* of cylinder liner 20, and in this state, the block material is solidified for a predetermined time and a desired cylinder block 10 is completed.

Integral cylinder block 10 with cylinder liner 20 completed as described above has an integral structure having high bonding strength by engraved grooves 21 between cylinder block 10 and cylinder liner 20. Further, cylinder block 10 has high thermal conductivity by metal layer 22 and it is possible to reduce the bore gap between adjacent cylinder blocks 10 as much as possible.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a cylinder liner, comprising:

coating a coating material onto the inner circumferential surface of a mold rotating and drying the coating material for a predetermined time;

applying an engraved-groove forming material to engrave the surface of the coating material;

forming a cylinder liner parent body by pouring and solidifying molten metal through the surface of the coating material where the engraved-groove forming material is applied; and roughening the outer surface of the cylinder liner with a plurality of engraved grooves for spraying, after drawing the cylinder parent out of the mold and removing the coating material and the engraved-groove forming material covering the outer surface of the cylinder liner parent body.

2. The method as defined in claim 1, further comprising forming a metal layer on the outer surface of the cylinder liner with the plurality of engraved grooves to improve thermal conductivity.

3. The method as defined in claim 2, wherein the engraved groove is formed to be depressed inside from the outer surface of the cylinder liner such that the upper portion is wide and the lower portion is narrow.

4. The method as defined in claim 2, wherein engraved grooves are distributed by thirty to three hundreds per area of 20 mm×20 mm of the outer surface of the cylinder liner.

5. The method as defined in claim 2, wherein the engraved groove has a diameter of 0.7±0.2 mm at the upper end and a depth of 0.4±0.2 mm.

6. The method as defined in claim 2, wherein the metal layer is formed by electric arc spraying that uses a plurality of wires.

7. The method as defined in claim 2, wherein the metal layer is made of the same material as the cylinder block, aluminum, or an aluminum alloy.

8. The method as defined in claim 7, wherein the aluminum alloy component of the metal layer contains 11~13 parts by weight of silicon to 100 parts by weight of aluminum.

9. The method as defined in claim 8, wherein the aluminum alloy component of the metal layer further contains any one, or two or more of 0.001~0.3 parts by weight of copper, 0.001~0.8 parts by weight of iron, 0.001~0.1 parts by weight of magnesium, 0.001~0.15 parts by weight of manganese, 0.001~0.2 parts by weight of zinc, and 0.001~0.008 parts by weight of beryllium, to 100 parts by weight of aluminum.

10. The method as defined in claim 2, wherein the metal layer has a 50~200 μm thickness.

* * * * *